US012768443B2

(12) United States Patent
Kamimura et al.

(10) Patent No.: US 12,768,443 B2
(45) Date of Patent: Oct. 20, 2026

(54) WORK VEHICLE AND DRIVE UNIT FOR WORK VEHICLE

(71) Applicant: EXEDY Corporation, Neyagawa (JP)

(72) Inventors: Hiroshi Kamimura, Neyagawa (JP); Ryoji Nakagawa, Neyagawa (JP); Takashi Arimoto, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 19/266,735

(22) Filed: Jul. 11, 2025

(65) Prior Publication Data

US 2026/0043472 A1 Feb. 12, 2026

(30) Foreign Application Priority Data

Aug. 9, 2024 (JP) ................................ 2024-133943

(51) Int. Cl.

*F16H 61/30* (2006.01)
*B66F 9/075* (2006.01)
*F16H 3/089* (2006.01)
*F16H 63/30* (2006.01)

(52) U.S. Cl.

CPC ......... *F16H 61/30* (2013.01); *B66F 9/07572* (2013.01); *F16H 3/089* (2013.01); *F16H 63/3026* (2013.01); *F16H 63/3069* (2013.01); *F16H 2063/3036* (2013.01); *F16H 2063/3073* (2013.01)

(58) Field of Classification Search

CPC ...... F16H 61/30; F16H 3/089; F16H 63/3026; F16H 63/3069; F16H 2063/3036; F16H 2063/3073; F16H 2063/3033; F16H 2200/0021; F16H 2200/0034; B66F 9/07572; B60Y 2200/15; F16D 25/0638

See application file for complete search history.

(56) References Cited

U.S. PATENT DOCUMENTS

| | | | | |
|---|---|---|---|---|
| 7,971,690 | B2 * | 7/2011 | Imaizumi | F16D 13/583 267/164 |
| 2018/0340608 | A1 * | 11/2018 | Lee | F16H 61/065 |
| 2023/0303372 | A1 | 9/2023 | Kamimura et al. | |

FOREIGN PATENT DOCUMENTS

| | | |
|---|---|---|
| JP | 2023-139830 A | 10/2023 |

* cited by examiner

*Primary Examiner* — Terence Boes
(74) *Attorney, Agent, or Firm* — United IP Counselors, LLC

(57) ABSTRACT

A work vehicle includes a drive wheel, an electric motor, a first clutch, a second clutch, a first transmission part, a second transmission part, a first hydraulic chamber, and an urging member. The electric motor is configured to drive the drive wheel. The first clutch includes a first piston and a plurality of first clutch discs. The second clutch includes a second piston and a plurality of second clutch discs. The first transmission part receives a mechanical power outputted from the electric motor through the first clutch. The second transmission part receives the mechanical power outputted from the electric motor through the second clutch. The first hydraulic chamber is supplied with a hydraulic pressure for moving the first piston toward the plurality of first clutch discs. The urging member urges the second piston toward the plurality of second clutch discs.

20 Claims, 5 Drawing Sheets

WORK VEHICLE AND DRIVE UNIT FOR WORK VEHICLE

CROSS-REFERENCE TO RELATED APPLICATIONS

This application is based on and claims the priority benefit of Japanese application No. 2024-133943 filed on Aug. 9, 2024, the contents of which are incorporated herein by reference.

TECHNICAL FIELD

The present invention relates to a work vehicle and a drive unit for the work vehicle.

BACKGROUND

Electric forklifts do not emit exhaust gas and are quiet as well. Therefore, the electric forklifts are widely used in indoor spaces such as factories and warehouses. The electric forklifts include an electric motor as a drive source thereof and travel by causing the electric motor to drive one or more drive wheels.

Japan Laid-open Patent Application Publication No. 2023-139830 proposes a type of electric forklift including a transmission. With the transmission installed in the electric forklift, it is possible to enhance the driving force of the electric motor and the velocity of the electric forklift.

SUMMARY OF THE INVENTION

There is a demand for a reduction in electric power consumption for the type of electric forklift with the transmission as described above. In view of this, it is an object of the present invention to provide a work vehicle with reduced electric power consumption.

A work vehicle according to a first aspect includes a drive wheel, an electric motor, a first clutch, a second clutch, a first transmission part, a second transmission part, a first hydraulic chamber, and an urging member. The electric motor is configured to drive the drive wheel. The first clutch includes a first piston and a plurality of first clutch discs. The second clutch includes a second piston and a plurality of second clutch discs. The first transmission part receives a mechanical power outputted from the electric motor through the first clutch. The second transmission part receives the mechanical power outputted from the electric motor through the second clutch. The first hydraulic chamber is supplied with a hydraulic pressure for moving the first piston toward the plurality of first clutch discs. The urging member urges the second piston toward the plurality of second clutch discs.

According to the configuration, when the first clutch is turned to a clutch-on state so as to transmit the mechanical power through the first transmission part, the hydraulic pressure is used. By contrast, when the second clutch is turned to a clutch-on state so as to transmit the mechanical power through the second transmission part, an urging force applied by the urging member is used; hence, the hydraulic pressure is not used herein. Because of this, it is possible to reduce the use of the electric motor for driving an oil pump for supplying the hydraulic pressure, whereby a reduction in electric power consumption is enabled.

A work vehicle according to a second aspect relates to the work vehicle according to the first aspect and is configured as follows. The urging member is a spring.

A work vehicle according to a third aspect relates to the work vehicle according to the second aspect and is configured as follows. The first clutch includes a first clutch outer having a cylindrical shape. The plurality of first clutch discs are each disposed inside the first clutch outer. The second clutch includes a second clutch outer having a cylindrical shape. The plurality of second clutch discs are each disposed inside the second clutch outer. The urging member is disposed radially outside the first clutch outer and the second clutch outer.

A work vehicle according to a fourth aspect relates to the work vehicle according to the third aspect and is configured as follows. The second piston includes a first protruding portion. The first protruding portion protrudes radially outward from the second clutch outer. The urging member urges the second piston through the first protruding portion.

A work vehicle according to a fifth aspect relates to the work vehicle according to the fourth aspect and is configured as follows. The first clutch outer includes a second protruding portion. The second protruding portion protrudes radially outward. The urging member includes a first end portion and a second end portion. The first end portion is supported by the first protruding portion. The second end portion is supported by the second protruding portion.

A work vehicle according to a sixth aspect relates to the work vehicle according to the fifth aspect and is configured as follows. The first clutch includes a pressure receiving member. The pressure receiving member is configured to sandwich the plurality of first clutch discs in cooperation with the first piston. The second protruding portion overlaps with the pressure receiving member as radially seen.

A work vehicle according to a seventh aspect relates to the work vehicle according to any of the third to fifth aspects and further includes a hydraulic balance chamber. The hydraulic balance chamber is defined by the second clutch outer and the second piston. The hydraulic balance chamber is filled with a hydraulic oil in an interior thereof.

A work vehicle according to an eighth aspect relates to the work vehicle according to any of the first to seventh aspects and further includes a second hydraulic chamber. The second hydraulic chamber is supplied with a hydraulic pressure for moving the second piston away from the plurality of second clutch discs.

A work vehicle according to a ninth aspect relates to the work vehicle according to the eighth aspect and further includes a wall member. The second piston includes a pressure applying portion and a piston portion. The pressure applying portion is configured to press the plurality of second clutch discs. The piston portion is disposed axially away from the pressure applying portion at an interval. The wall member is disposed to be movable relative to the piston portion. The wall member defines the second hydraulic chamber in cooperation with the piston portion.

A drive unit according to a tenth aspect relates to a drive unit for a work vehicle. The drive unit includes an electric motor, a first clutch, a second clutch, a first transmission part, a second transmission part, a first hydraulic chamber, and an urging member. The first clutch includes a first piston and a plurality of first clutch discs. The second clutch includes a second piston and a plurality of second clutch discs. The first transmission part receives a mechanical power outputted from the electric motor through the first clutch. The second transmission part receives the mechanical power outputted from the electric motor through the second clutch. The first hydraulic chamber is supplied with a hydraulic pressure for moving the first piston toward the plurality of first clutch discs. The urging member urges the second piston toward the plurality of second clutch discs.

Overall, according to the present invention, reduction in electric power consumption is enabled in the work vehicle.

DETAILED DESCRIPTION

A drive unit for a work vehicle and a work vehicle equipped therewith according to the present preferred embodiment will be hereinafter explained with reference to drawings. It should be noted that a forklift will be hereinafter exemplified as the work vehicle. It should be also noted that the work vehicle is not limited to the forklift; alternatively, the work vehicle may be, for instance, a towing tractor or a rough terrain crane.

In the following explanation, the term "axial direction" refers to an extending direction of a rotational axis O for both a first clutch 6 and a second clutch 7. The term "circumferential direction" refers to a circumferential direction of an imaginary circle about the rotational axis O, whereas the term "radial direction" refers to a radial direction of the imaginary circle about the rotational axis O. Further, the term "first side in the axial direction" means the right side in FIG. 2, whereas the term "second side in the axial direction" means the left side in FIG. 2. Furthermore, the terms "front" and "rear" mean the front side and the rear side with reference to a vehicle body 101. It should be noted that in FIG. 1, the left side corresponds to the front side, whereas the right side corresponds to the rear side.

[Forklift]

Figure 1:
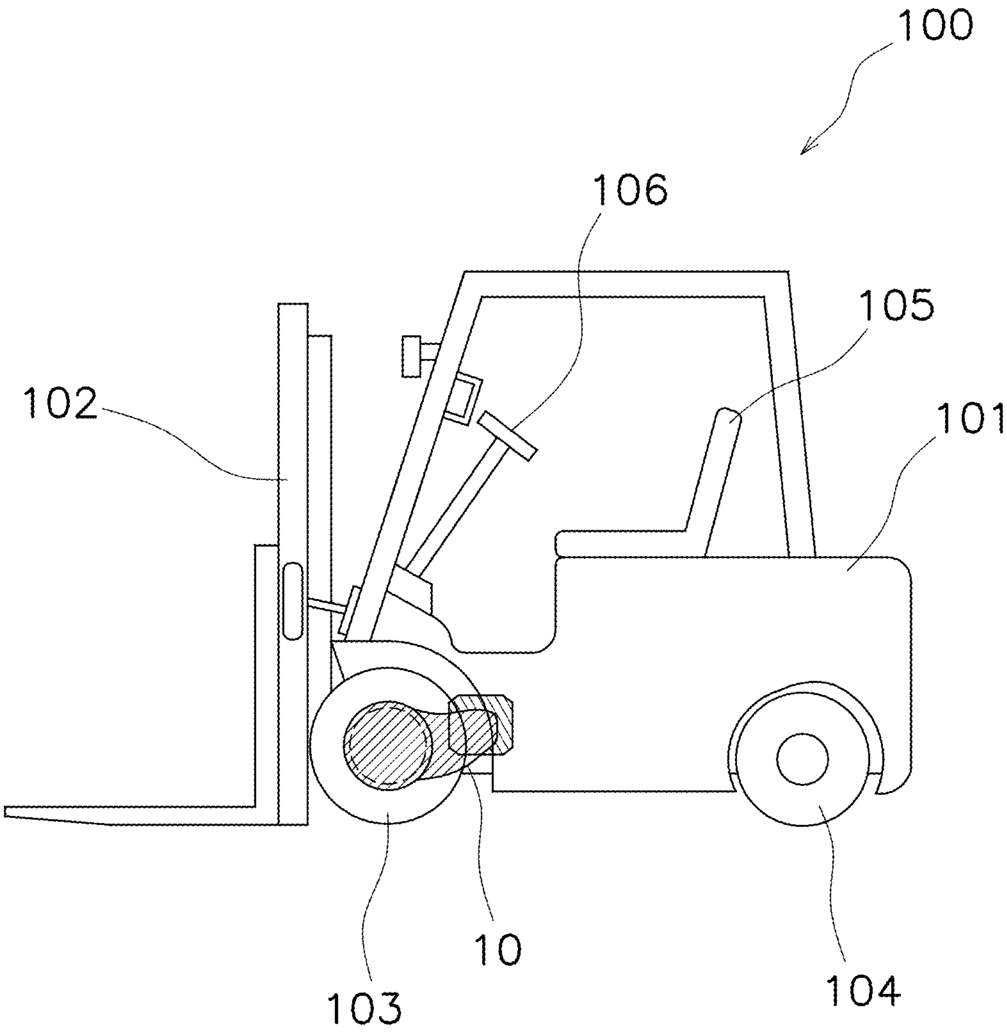
FIG. 1 is a side view of a forklift.

FIG. 1 is a side view of a forklift. As shown in FIG. 1, a forklift 100 includes the vehicle body 101, a lift device 102, a pair of drive wheels 103, and a drive unit 10. Further, the forklift 100 includes a pair of driven wheels 104, a seat 105, an operating part 106, and so forth as well. It should be noted that in the present preferred embodiment, the front wheels are set as the drive wheels 103, whereas the rear wheels are set as the driven wheels 104.

The forklift 100 is an electric forklift including an electric motor 2 as a drive source. It should be noted that the forklift 100 does not include any internal combustion engine. Further, the forklift 100 includes a battery (omitted in illustration) as a power source.

The forklift 100 is enabled to perform a variety of works, including loading cargo, by the lift device 102. The lift device 102 is disposed in front of the vehicle body 101 and is attached to the vehicle body 101. The drive wheels 103 are attached to a front part of the vehicle body 101. The driven wheels 104 are attached to a rear part of the vehicle body 101.

[Drive Unit]

The drive unit 10 is configured to be installed in the forklift 100. The drive unit 10 is disposed inside the vehicle body 101. The drive unit 10 is disposed in the front part of the vehicle body 101. The drive unit 10 is configured to drive the drive wheels 103.

Figure 2:
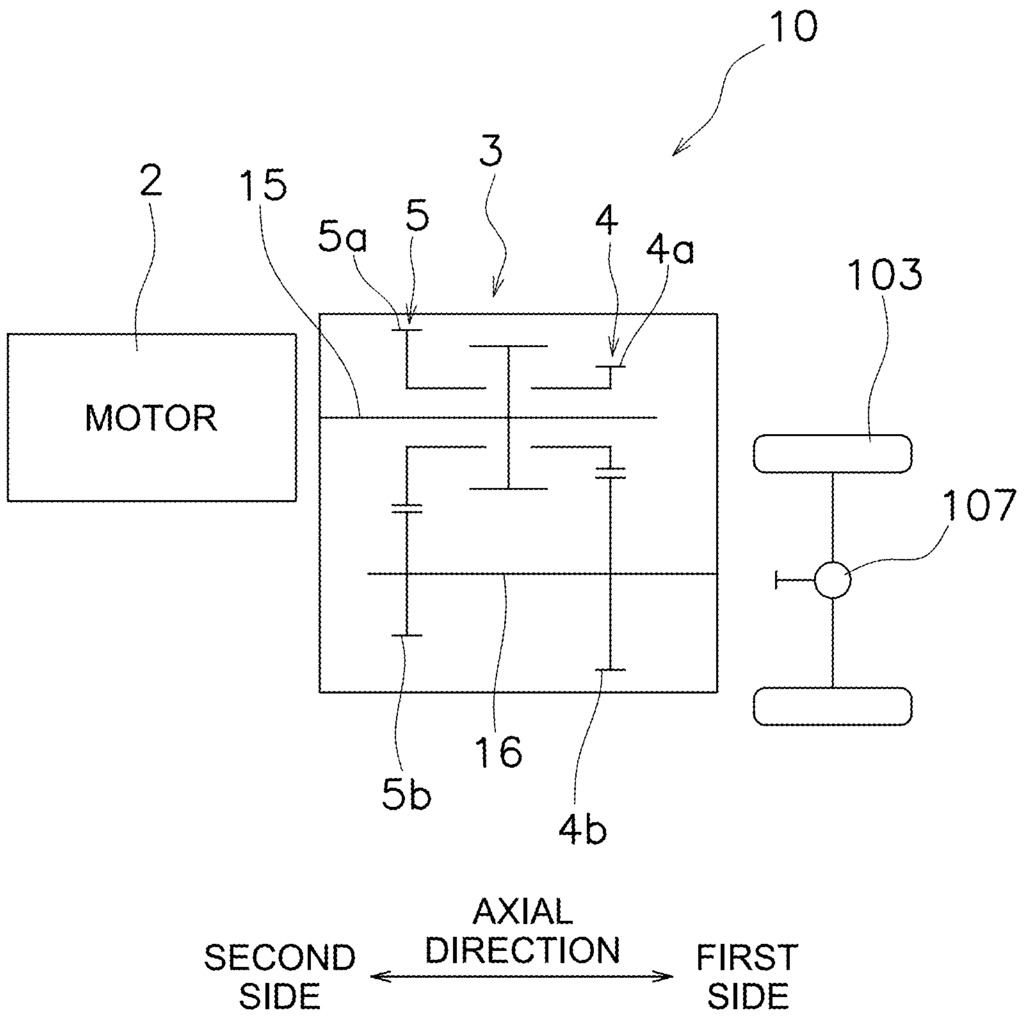
FIG. 2 is a schematic diagram of a drive unit.

FIG. 2 is a schematic diagram of a drive unit. As shown in FIG. 2, the drive unit 10 is configured to drive and rotate the drive wheels 103. When described in detail, the drive unit 10 outputs a driving force to the pair of drive wheels 103 through a differential gear 107. The drive unit 10 includes the electric motor 2 and a transmission 3.

[Electric Motor]

The electric motor 2 is configured to drive and rotate the drive wheels 103. The electric motor 2 is driven when supplied with electricity from the battery. The electric motor 2 includes a rotor (omitted in illustration) and a stator (omitted in illustration). The stator is non-rotatable together with a motor case. The rotor is disposed to be rotatable.

[Transmission]

Figure 3:
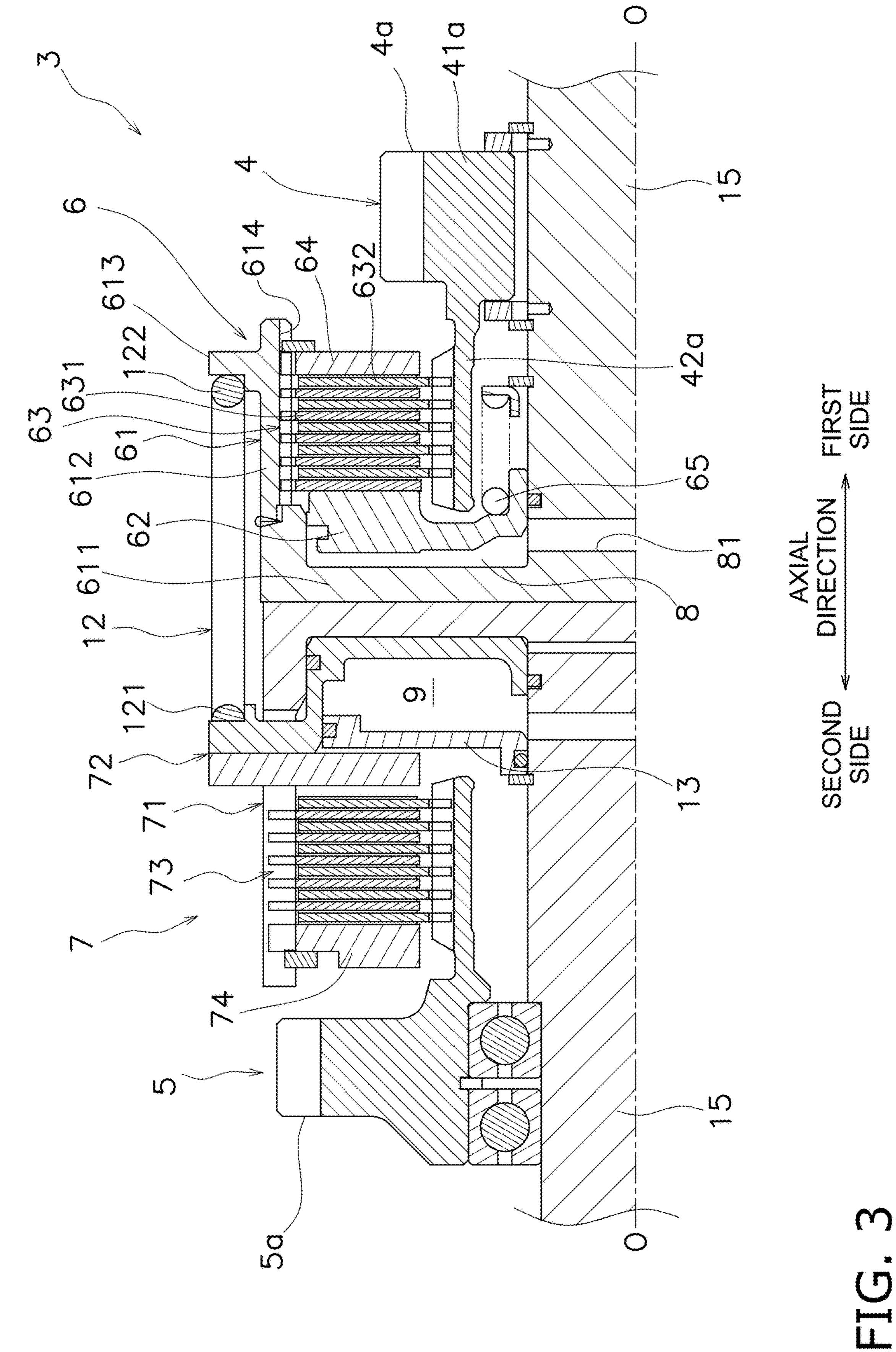
FIG. 3 is a cross-sectional view of a transmission in a clutch-on state of a first clutch.
Figure 4:
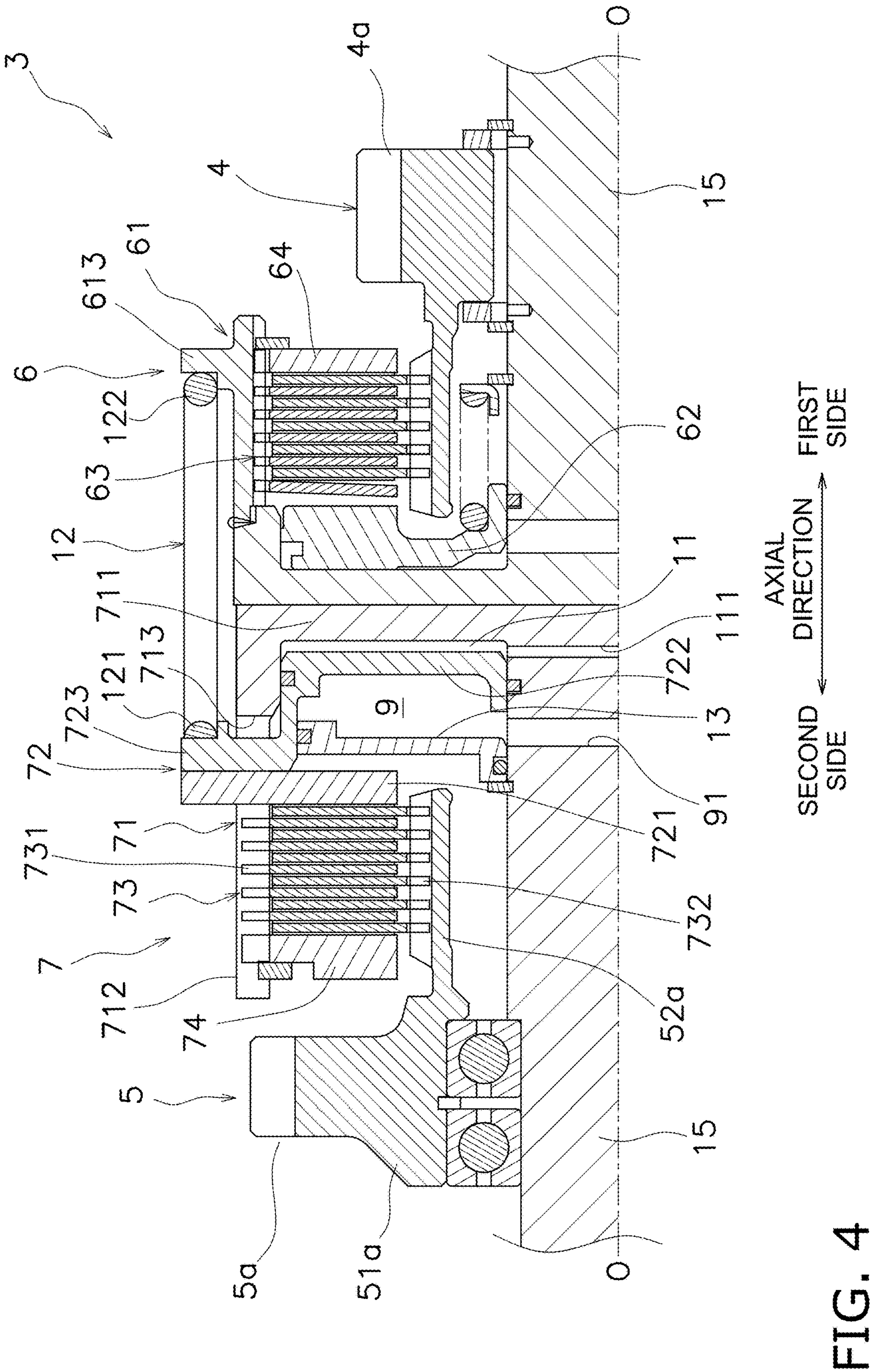
FIG. 4 is a cross-sectional view of the transmission in a clutch-on state of a second clutch.

FIG. 3 is a cross-sectional view of the transmission 3 in a clutch-on state of the first clutch 6, whereas FIG. 4 is a cross-sectional view of the transmission 3 in a clutch-on state of the second clutch 7. As shown in FIGS. 2 to 4, the transmission 3 is configured to change the rotational speed of the electric motor 2 at a variable gear ratio. For example, the transmission 3 is a manual transmission. It should be noted that the transmission 3 may be an automatic transmission.

The transmission 3 includes two-stage gear trains. In other words, the transmission 3 includes a first gear train 4 (exemplary first transmission part), and a second gear train 5 (exemplary second transmission part). Further, the transmission 3 includes the first clutch 6, the second clutch 7, a first hydraulic chamber 8, a second hydraulic chamber 9, a hydraulic balance chamber 11, a first urging member 12 (exemplary urging member), and a wall member 13.

<First and Second Gear Trains>

The first gear train 4 receives a mechanical power, outputted from the electric motor 2, through the first clutch 6. The second gear train 5 receives the mechanical power, outputted from the electric motor 2, through the second clutch 7. The first gear train 4 is disposed on the first side of the second gear train 5 in the axial direction. The first gear train 4 is larger in gear ratio than the second gear train 5.

The first and second gear trains 4 and 5 each include a plurality of gears (e.g., a pair of gears). Specifically, the first gear train 4 includes a first drive gear **4*a* and a first driven gear 4*b*. The first drive gear 4*a* and the first driven gear 4*b* are meshed with each other. On the other hand, the second gear train 5 includes a second drive gear 5*a* and a second driven gear 5*b*. The second drive gear 5*a* and the second driven gear 5*b*** are meshed with each other.

The first drive gear **4*a* is smaller in diameter than the second drive gear 5*a*. On the other hand, the first driven gear 4*b* is larger in diameter than the second driven gear 5*b*. The first drive gear 4*a* includes a first gear body 41*a* and a first engaging portion 42*a*. The first engaging portion 42*a* extends from the first gear body 41*a* to the second side in the axial direction. The first engaging portion 42*a* is configured to be engaged at the outer peripheral surface thereof with one or more first driven plates 632** (to be described).

The second drive gear **5*a* includes a second gear body 51*a* and a second engaging portion 52*a*. The second engaging portion 52*a* has a cylindrical shape. The second engaging portion 52*a* extends from the second gear body 51*a* to the first side in the axial direction. The second engaging portion 52*a* is configured to be engaged at the outer peripheral surface thereof with one or more second driven plates 732** (to be described).

The transmission 3 transmits the mechanical power, outputted from the electric motor 2, to the drive wheels 103 through either the first gear train 4 or the second gear train

5. Thus, either the first gear train 4 or the second gear train 5 is selectable in the transmission 3; hence, the gear ratio is made variable in the transmission 3.

The transmission 3 includes an input shaft 15 and an output shaft 16. The input shaft 15 and the output shaft 16 each extend in the axial direction. The first and second drive gears 4*a* and 5*a* are attached to the input shaft 15. The first and second drive gears 4*a* and 5*a* are rotatable relative to the input shaft 15. The first and second driven gears 4*b* and 5*b* are attached to the output shaft 16. The first and second driven gears 4*b* and 5*b* are rotated unitarily with the output shaft 16.

<First and Second Clutches>

As shown in FIG. 3, the first and second clutches 6 and 7 are supported by the input shaft 15. The first and second clutches 6 and 7 are configured to switch a power transmission path to either the first gear train 4 or the second gear train 5. It should be noted that a wet-type multi-plate clutch can be employed as each of the first and second clutches 6 and 7.

The first clutch 6 is disposed on the first side of the second clutch 7 in the axial direction. The first clutch 6 includes a first clutch outer 61, a first piston 62, a plurality of first clutch discs 63, and a first pressure receiving member 64 (exemplary pressure receiving member).

The first clutch outer 61 has a cylindrical shape. The first clutch outer 61 is configured to be rotated unitarily with the input shaft 15. When described in detail, the first clutch outer 61 includes a first disc portion 611, a first cylindrical portion 612, and a second protruding portion 613. The first disc portion 611, the first cylindrical portion 612, and the second protruding portion 613 are integrated as a single member.

The first disc portion 611 extends radially outward from the input shaft 15. The first disc portion 611 is configured to be rotated unitarily with the input shaft 15. It should be noted that the first disc portion 611 is integrated with the input shaft 15 as a single member; alternatively, the first disc portion 611 may be provided as a member separated from the input shaft 15.

The first cylindrical portion 612 extends from the outer peripheral end of the first disc portion 611 to the first side in the axial direction. The first cylindrical portion 612 includes a plurality of grooves 614 extending in the axial direction. The grooves 614 are each provided on the inner peripheral surface of the first cylindrical portion 612. The grooves 614 do not each penetrate the first cylindrical portion 612.

The second protruding portion 613 protrudes radially outward from the first cylindrical portion 612. The second protruding portion 613 is made in the shape of an annulus extending in the circumferential direction. The second protruding portion 613 is disposed to overlap with the first pressure receiving member 64 as radially seen.

The first piston 62 is disposed inside the first clutch outer 61. The first piston 62 is disposed to be movable in the axial direction. The first piston 62 is configured to press the first clutch discs 63. The first piston 62 is slid on the input shaft 15. The first piston 62 is being urged to the second side in the axial direction by a second urging member 65. The second urging member 65 is, for instance, a compression coil spring.

The plurality of first clutch discs 63 are disposed axially between the first piston 62 and the first pressure receiving member 64. The plurality of first clutch discs 63 are disposed inside the first clutch outer 61. The plurality of first clutch discs 63 are composed of one or more first drive plates 631 and the one or more first driven plates 632.

The first drive plates 631 are rotated unitarily with the first clutch outer 61. When described in detail, the first drive plates 631 are engaged with the grooves 614 of the first clutch outer 61. Because of this, the first drive plates 631 are engaged with the first clutch outer 61, while being axially movable with respect thereto and being non-rotatable relative thereto.

The first driven plates 632 are rotated unitarily with the first drive gear 4*a* of the first gear train 4. When described in detail, the first driven plates 632 are engaged with the first engaging portion 42*a*. The first driven plates 632 are engaged with the first engaging portion 42*a*, while being non-rotatable relative thereto and being axially movable with respect thereto.

The first pressure receiving member 64 is configured to axially sandwich the first clutch discs 63 in cooperation with the first piston 62. The first pressure receiving member 64 is attached to the first clutch outer 61, while being non-rotatable relative thereto. The first pressure receiving member 64 is disposed to be immovable to the first side in the axial direction.

When the first clutch 6 is turned to the clutch-on state, transmission of the mechanical power is made through the first gear train 4. When described in detail, the first clutch 6 is turned to the clutch-on state by moving the first piston 62 toward the first clutch discs 63 so as to sandwich the first clutch discs 63 between the first piston 62 and the first pressure receiving member 64. When the clutch-on state of the first clutch 6 is made, the first drive gear 4*a* is rotated unitarily with the input shaft 15. As a result, the mechanical power, outputted from the input shaft 15, is transmitted to the output shaft 16 through the first gear train 4. The first clutch 6 is configured to transmit the mechanical power to the first gear train 4 and to block transmission of the mechanical power.

As shown in FIG. 4, the second clutch 7 includes a second clutch outer 71, a second piston 72, a plurality of second clutch discs 73, and a second pressure receiving member 74.

The second clutch outer 71 has a cylindrical shape. The second clutch outer 71 is configured to be rotated unitarily with the input shaft 15. When described in detail, the second clutch outer 71 includes a second disc portion 711 and a second cylindrical portion 712. The second disc portion 711 and the second cylindrical portion 712 are integrated with each other as a single member.

The second disc portion 711 extends radially outward from the input shaft 15. The second disc portion 711 is configured to be rotated unitarily with the input shaft 15. It should be noted that the second disc portion 711 is integrated with the input shaft 15 as a single member; alternatively, the second disc portion 711 may be provided as a member separated from the input shaft 15.

Figure 5:
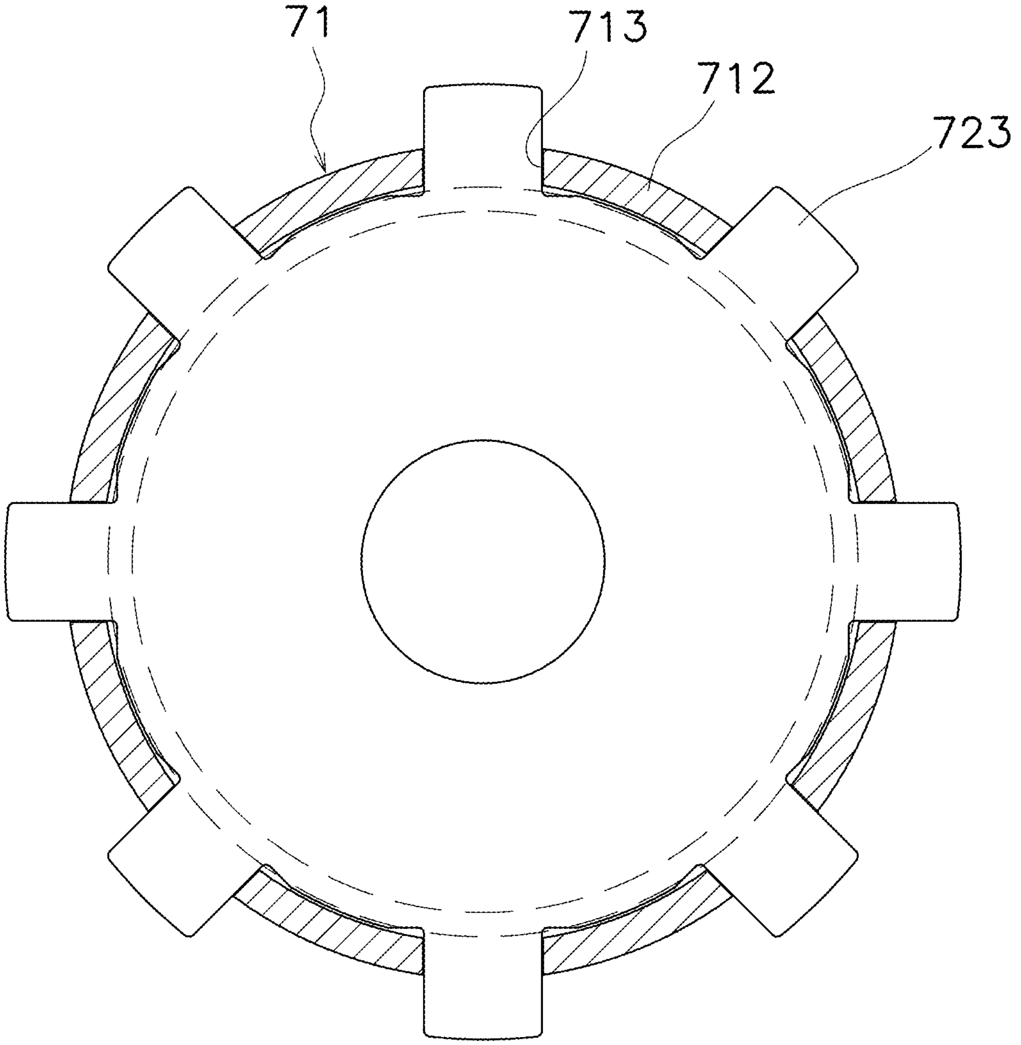
FIG. 5 is a cross-sectional view of a second piston and a second clutch outer as seen in an axial direction.

The second cylindrical portion 712 extends from the outer peripheral end of the second disc portion 711 to the second side in the axial direction. The second cylindrical portion 712 includes a plurality of slits 713 extending in the axial direction. The slits 713 radially each penetrate the second cylindrical portion 712. The slits 713 are disposed circumferentially away from each other at intervals (see FIG. 5). The slits 713 each open to the second side in the axial direction. It should be noted that FIG. 5 is a cross-sectional view of the second piston 72 and the second clutch outer 71 as axially seen.

The second piston 72 is disposed inside the second clutch outer 71, excluding a plurality of first protruding portions 723 thereof (to be described). The second piston 72 is disposed to be movable in the axial direction. The second piston 72 is configured to press the second clutch discs 73. The second piston 72 is slid on the input shaft 15. It should be noted that the second piston 72 is configured to be rotated unitarily with the second clutch outer 71.

The second piston 72 includes a pressure applying portion 721, a piston portion 722, and the plural first protruding portions 723. The pressure applying portion 721 is made in the shape of an annulus extending in the circumferential direction. The pressure applying portion 721 is disposed in opposition to the second clutch discs 73. The pressure applying portion 721 is configured to press the second clutch discs 73. The pressure applying portion 721 is axially movable with respect to the second clutch outer 71.

The piston portion 722 is disposed to be axially movable inside the second clutch outer 71. The piston portion 722 partitions off the interior of the second clutch outer 71 in an airtight manner. When described in detail, the piston portion 722 partitions off the interior of the second clutch outer 71 into the second hydraulic chamber 9 and the hydraulic balance chamber 11.

The piston portion 722 is configured to be axially moved unitarily with the pressure applying portion 721. It should be noted that the piston portion 722 and the pressure applying portion 721 may be moved separately from each other to the first side in the axial direction.

The piston portion 722 is disposed axially away from the pressure applying portion 721 at an interval. When described in detail, the outer peripheral part of the piston portion 722 is in contact with the pressure applying portion 721, whereas the remaining part thereof is disposed axially away from the pressure applying portion 721 at an interval. In other words, the outer peripheral part of the piston portion 722 is disposed on the second side of the remaining part thereof in the axial direction.

The first protruding portions 723 protrude radially outward from the second clutch outer 71. In other words, the first protruding portions 723 are included in the second piston 72 as portions that protrude radially outward from the second clutch outer 71. In the present preferred embodiment, the first protruding portions 723 are composed of a part of the pressure applying portion 721 and a part of the piston portion 722.

As shown in FIG. 5, the first protruding portions 723 are disposed circumferentially away from each other at intervals. The first protruding portions 723 are engaged with the slits 713, respectively. Because of this, the second piston 72 is rotated unitarily with the second clutch outer 71. The first protruding portions 723 protrude radially outward through the slits 713, respectively.

As shown in FIG. 4, the wall member 13 has a disc shape. The wall member 13 defines the second hydraulic chamber 9 in cooperation with the piston portion 722. The wall member 13 is disposed axially away from the piston portion 722 at an interval. The wall member 13 is disposed axially between the piston portion 722 and the pressure applying portion 721. The wall member 13 is disposed to be movable relative to the piston portion 722. When described in detail, the wall member 13 is restricted from moving to the second side in the axial direction by a stopper ring or so the like.

The plural second clutch discs 73 are disposed axially between the second piston 72 and the second pressure receiving member 74. The plural second clutch discs 73 are disposed inside the second clutch outer 71. The plural second clutch discs 73 are composed of one or more second drive plates 731 and the one or more second driven plates 732.

The second drive plates 731 are rotated unitarily with the second clutch outer 71. When described in detail, the second drive plates 731 are engaged with the slits 713 of the second clutch outer 71, respectively. Because of this, the second drive plates 731 are engaged with the second clutch outer 71, while being axially movable with respect thereto and being non-rotatable relative thereto.

The second driven plates 732 are rotated unitarily with the second drive gear 5*a* of the second gear train 5. When described in detail, the second driven plates 732 are engaged with the second engaging portion 52*a*. The second driven plates 732 are engaged with the second engaging portion 52*a*, while being non-rotatable relative thereto and being axially movable with respect thereto.

The second pressure receiving member 74 is configured to axially sandwich the second clutch discs 73 in cooperation with the second piston 72 (specifically, the pressure applying portion 721). The second pressure receiving member 74 is attached to the second clutch outer 71, while being non-rotatable relative thereto. The second pressure receiving member 74 is disposed to be immovable to the second side in the axial direction.

When the second clutch 7 is turned to the clutch-on state, transmission of the mechanical power is made through the second gear train 5. When described in detail, the second clutch 7 is turned to the clutch-on state by moving the second piston 72 toward the second clutch discs 73 so as to sandwich the second clutch discs 73 between the second piston 72 and the second pressure receiving member 74. When the clutch-on state of the second clutch 7 is made, the second drive gear 5*a* is rotated unitarily with the input shaft 15. As a result, the mechanical power, outputted from the input shaft 15, is transmitted to the output shaft 16 through the second gear train 5. The second clutch 7 is configured to transmit the mechanical power to the second gear train 5 and to block transmission of the mechanical power.

<First Hydraulic Chamber>

As shown in FIG. 3, the first hydraulic chamber 8 is defined by the first clutch outer 61 and the first piston 62. The first hydraulic chamber 8 is supplied with a hydraulic pressure for moving the first piston 62 toward the first clutch discs 63. The first hydraulic chamber 8 is supplied with a hydraulic oil through a first supply pathway 81. It should be noted that an oil pump for supplying the hydraulic pressure to the first hydraulic chamber 8 is driven by either the electric motor 2 or another electric motor (omitted in illustration).

When the first hydraulic chamber 8 is supplied with the hydraulic pressure, the first piston 62 is moved to the first side in the axial direction against the urging force applied by the second urging member 65. As a result, the first clutch 6 is turned to the clutch-on state, whereby transmission of the mechanical power is made through the first gear train 4. In this way, the clutch-on state of the first clutch 6 is made by the hydraulic pressure. On the other hand, when the first hydraulic chamber 8 is stopped from being supplied with the hydraulic pressure, the first clutch 6 is turned to a clutch-off state. It should be noted that the first piston 62 is moved to the second side in the axial direction by the urging force applied by the second urging member 65.

<Second Hydraulic Chamber>

As shown in FIG. 4, the second hydraulic chamber 9 is defined by the second piston 72 and the wall member 13. The second hydraulic chamber 9 is supplied with a hydraulic pressure for moving the second piston 72 away from the second clutch discs 73. The second hydraulic chamber 9 is supplied with the hydraulic oil through a second supply pathway 91. It should be noted that an oil pump for supplying the hydraulic pressure to the second hydraulic chamber 9 is driven by either the electric motor 2 or another electric motor (omitted in illustration). Further, the oil pump herein described is usable as the aforementioned oil pump for supplying the hydraulic pressure to the first hydraulic chamber 8. When the second hydraulic chamber 9 is supplied with the hydraulic oil, the first hydraulic chamber 8 is also supplied with the hydraulic oil.

When the second hydraulic chamber 9 is supplied with the hydraulic pressure, the second piston 72 is moved to the first side in the axial direction against the urging force applied by the first urging member 12. As a result, the second clutch 7 is turned to a clutch-off state. In other words, transmission of the mechanical power through the second gear train 5 is blocked.

<Hydraulic Balance Chamber>

The hydraulic balance chamber 11 is filled with the hydraulic oil in the interior thereof. The hydraulic balance chamber 11 is defined by the second clutch outer 71 and the second piston 72 (specifically, the piston portion 722). The hydraulic oil is configured to be supplied/discharged to/from the hydraulic balance chamber 11 through an oil pathway 111.

<First Urging Member>

The first urging member 12 urges the second piston 72 toward the second clutch discs 73. The first urging member 12 is, for instance, a spring. More specifically, the first urging member 12 is a coil spring. The first urging member 12 extends in the axial direction. The first urging member 12 is disposed in a compressed state.

The first urging member 12 is disposed radially outside the first clutch outer 61 and the second clutch outer 71. In other words, the first urging member 12 is disposed to enclose the first clutch outer 61 and the second clutch outer 71.

The first urging member 12 includes a first end portion 121 and a second end portion 122 in the axial direction. The first end portion 121 is supported by the first protruding portions 723. The second end portion 122 is supported by the second protruding portion 613. Because of this, the first urging member 12 urges the second piston 72 to the second side in the axial direction through the first protruding portions 723.

When the second piston 72 is moved to the second side in the axial direction by the urging force applied by the first urging member 12, the second clutch 7 is turned to the clutch-on state. As a result, the mechanical power is transmitted through the second gear train 5. In this way, the second clutch 7 is turned to the clutch-on state not by the hydraulic pressure but by the urging force applied by the first urging member 12. On the other hand, when the second hydraulic chamber 9 is supplied with the hydraulic pressure, the second piston 72 is moved to the first side in the axial direction against the urging force applied by the first urging member 12, whereby the second clutch 7 is turned to the clutch-off state.

<Actuation Method>

First, in some conditions that a high torque is required, such as vehicle starting or traveling on a hill, the first and second hydraulic chambers 8 and 9 are supplied with the hydraulic pressure. Accordingly, the first clutch 6 is turned to the clutch-on state, whereas the second clutch 7 is turned to the clutch-off state. As a result, transmission of the mechanical power is made through the first gear train 4.

In the other conditions that a high torque is not required, such as normal traveling, the first and second hydraulic chambers 8 and 9 are stopped from being supplied with the hydraulic pressure. Accordingly, the first clutch 6 is turned to the clutch-off state, whereas the second clutch 7 is turned to the clutch-on state. As a result, transmission of the mechanical power is made through the second gear train 5.

Thus, when transmission of the mechanical power is made through the second gear train 5, it is made possible to stop the oil pump for supplying the hydraulic pressure. As a result, electric power consumption is enabled.

[Modifications]

One preferred embodiment of the present invention has been described above. However, the present invention is not limited to the preferred embodiment described above, and a variety of changes can be made without departing from the gist of the present invention. It should be noted that, basically speaking, respective modifications to be described are applicable simultaneously.

(a) In the preferred embodiment described above, the first gear train 4 is larger in gear ratio than the second gear train 5; however, the first gear train 4 may be smaller in gear ratio than the second gear train 5. In other words, in vehicle starting, traveling on a hill, or so forth, the second clutch 7 may be turned to the clutch-on state, whereby transmission of the mechanical power may be made through the second gear train 5; by contrast, in normal traveling, the first clutch 6 may be turned to the clutch-on state, whereby transmission of the mechanical power may be made through the first gear train 4.

(b) In the preferred embodiment described above, the first transmission part is made in the form of a gear train; alternatively, the first transmission part may be made in any suitable form other than the gear train. For example, the first transmission part may be composed of a pair of pulleys, a belt, and so forth. It should be noted that this configuration is also true of the second transmission part.

(c) A reducer may be installed between the electric motor 2 and the transmission 3. Alternatively, the reducer may be installed between the transmission 3 and the drive wheels 103.

(d) In the preferred embodiment described above, the first protruding portions 723 are composed of a part of the pressure applying portion 721 and a part of the piston portion 722; however, the first protruding portions 723 are not limited in configuration to this. For example, the first protruding portions 723 may be composed of only a part of the pressure applying portion 721, or alternatively, only a part of the piston portion 722. It should be noted that when the first protruding portions 723 are composed of only a part of the pressure applying portion 721, the pressure applying portion 721 is preferably configured to be moved unitarily with the piston portion 722 to the first side in the axial direction.

(e) The first urging member 12 does not have to be made in the form of a spring as long as urging the second piston 72 by means other than the hydraulic pressure. For example, the first urging member 12 may be made in the form of a cam mechanism or so forth. When made in the form of the cam mechanism, the first urging member 12 may be configured to move the second piston 72 to the second side in the axial direction by urging the second piston 72 to the second side in the axial direction in conjunction with rotation of a cam thereof.

LIST OF REFERENCE NUMERALS

2: Electric motor, 4: First gear train, 5: Second gear train, 6: First clutch, 61: First clutch outer, 613: Second protruding portion, 62: First piston, 63: First clutch disc, 7: Second clutch, 71: Second clutch outer, 72: Second piston, 721: Pressure applying portion, 722: Piston portion, 723: First protruding portion, 73: Second clutch disc, 8: First hydraulic chamber, 9: Second hydraulic chamber, 10: Drive unit, 11: Hydraulic balance chamber, 12: First urging member, 121: First end portion, 122: Second end portion, 13: Wall member, 100: Forklift, 103: Drive wheel

The invention claimed is:

1. A work vehicle comprising:
a drive wheel;
an electric motor configured to drive the drive wheel;
a first clutch including a first piston, a plurality of first clutch discs, and a first hydraulic chamber being formed within the first clutch, the first piston moving toward the plurality of first clutch discs when the first hydraulic chamber is supplied with a hydraulic pressure;
a second clutch including a second piston and a plurality of second clutch discs;
a first transmission part configured to receive a mechanical power outputted from the electric motor through the first clutch;
a second transmission part configured to receive the mechanical power outputted from the electric motor through the second clutch; and
an urging member urging the second piston toward the plurality of second clutch discs.

2. The work vehicle according to claim 1, wherein the urging member is a spring.

3. The work vehicle according to claim 2, wherein
the first clutch includes a first clutch outer having a cylindrical shape,
the plurality of first clutch discs are each disposed inside the first clutch outer,
the second clutch includes a second clutch outer having a cylindrical shape,
the plurality of second clutch discs are each disposed inside the second clutch outer, and
the urging member is disposed radially outside the first clutch outer and the second clutch outer.

4. The work vehicle according to claim 3, wherein
the second piston includes a first protruding portion protruding radially outward from the second clutch outer, and
the urging member urges the second piston through the first protruding portion.

5. The work vehicle according to claim 4, wherein
the first clutch outer includes a second protruding portion protruding radially outward, and
the urging member includes a first end portion and a second end portion, the first end portion supported by the first protruding portion, the second end portion supported by the second protruding portion.

6. The work vehicle according to claim 5, wherein
the first clutch includes a pressure receiving member configured to sandwich the plurality of first clutch discs in cooperation with the first piston, and
the second protruding portion overlaps with the pressure receiving member as radially seen.

7. The work vehicle according to claim 3, wherein
the second clutch outer and the second piston defines a hydraulic balance chamber that is configured to be filled with a hydraulic oil in an interior thereof.

8. The work vehicle according to claim 1, wherein
the second clutch has a second hydraulic chamber formed therein and is configured to be supplied with a hydraulic pressure for moving the second piston away from the plurality of second clutch discs.

9. The work vehicle according to claim 8, further comprising:
a wall member, wherein
the second piston includes
a pressure applying portion configured to press the plurality of second clutch discs, and
a piston portion disposed axially away from the pressure applying portion at an interval, and
the wall member is disposed to be movable relative to the piston portion, the wall member defining the second hydraulic chamber in cooperation with the piston portion.

10. A drive unit for a work vehicle comprising:
an electric motor;
a first clutch including a first piston, a plurality of first clutch discs, and a first hydraulic chamber being formed with the first clutch, the first piston being configured to move toward the plurality of clutch discs when the first hydraulic chamber is supplied with a hydraulic pressure;
a second clutch including a second piston and a plurality of second clutch discs;
a first transmission part configured to receive a mechanical power outputted from the electric motor through the first clutch;
a second transmission part configured to receive the mechanical power outputted from the electric motor through the second clutch; and
an urging member urging the second piston toward the plurality of second clutch discs.

11. The work vehicle according to claim 2, wherein
the second clutch has a second hydraulic chamber formed therein and is configured to be supplied with a hydraulic pressure for moving the second piston away from the plurality of second clutch discs.

12. The work vehicle according to claim 3, wherein
the second clutch has a second hydraulic chamber formed therein and is configured to be supplied with a hydraulic pressure for moving the second piston away from the plurality of second clutch discs.

13. The work vehicle according to claim 4, wherein
the second clutch has a second hydraulic chamber formed therein and is configured to be supplied with a hydraulic pressure for moving the second piston away from the plurality of second clutch discs.

14. The work vehicle according to claim 5, wherein
the second clutch has a second hydraulic chamber formed therein and is configured to be supplied with a hydraulic pressure for moving the second piston away from the plurality of second clutch discs.

15. The work vehicle according to claim 6, wherein
the second clutch has a second hydraulic chamber formed therein and is configured to be supplied with a hydraulic pressure for moving the second piston away from the plurality of second clutch discs.

16. The work vehicle according to claim 7, wherein
the second clutch has a second hydraulic chamber formed therein and is configured to be supplied with a hydraulic pressure for moving the second piston away from the plurality of second clutch discs.

17. The work vehicle according to claim 11, further comprising:

a wall member, wherein the second piston includes a pressure applying portion configured to press the plurality of second clutch discs, and a piston portion disposed axially away from the pressure applying portion at an interval, and the wall member is disposed to be movable relative to the piston portion, the wall member defining the second hydraulic chamber in cooperation with the piston portion.

18. The work vehicle according to claim 12, further comprising:

a wall member, wherein the second piston includes a pressure applying portion configured to press the plurality of second clutch discs, and a piston portion disposed axially away from the pressure applying portion at an interval, and the wall member is disposed to be movable relative to the piston portion, the wall member defining the second hydraulic chamber in cooperation with the piston portion.

19. The work vehicle according to claim 13, further comprising:

a wall member, wherein the second piston includes a pressure applying portion configured to press the plurality of second clutch discs, and a piston portion disposed axially away from the pressure applying portion at an interval, and the wall member is disposed to be movable relative to the piston portion, the wall member defining the second hydraulic chamber in cooperation with the piston portion.

20. The work vehicle according to claim 14, further comprising:

a wall member, wherein the second piston includes a pressure applying portion configured to press the plurality of second clutch discs, and a piston portion disposed axially away from the pressure applying portion at an interval, and the wall member is disposed to be movable relative to the piston portion, the wall member defining the second hydraulic chamber in cooperation with the piston portion.

* * * * *